United States Patent [19]

Damiens

[11] 4,247,649
[45] Jan. 27, 1981

[54] METHOD OF MAKING A LIGHTWEIGHT PLASTER FROM GRANULES OF EXPANDED THERMOPLASTICS

[75] Inventor: Gerard Damiens, Chatel-St-Denis, Switzerland

[73] Assignee: Fresse S.A., Switzerland

[21] Appl. No.: 108,172

[22] Filed: Dec. 28, 1979

Related U.S. Application Data

[63] Continuation of Ser. No. 908,799, May 23, 1978, abandoned.

[30] Foreign Application Priority Data

May 23, 1977 [CH] Switzerland .................... 6305/77

[51] Int. Cl.³ ............................................. C08J 9/22
[52] U.S. Cl. ................................. 521/55; 521/54; 521/57; 521/83; 521/139
[58] Field of Search ............................ 521/54, 55, 57

[56] References Cited

U.S. PATENT DOCUMENTS

| | | | |
|---|---|---|---|
| 3,214,393 | 10/1965 | Sefton ..................................... | 521/55 |
| 3,764,357 | 10/1973 | Bowles et al. .......................... | 521/55 |
| 3,869,295 | 3/1975 | Bowles et al. .......................... | 521/55 |
| 3,899,455 | 8/1975 | Unterstenhoefer et al. ........... | 521/55 |

*Primary Examiner*—Morton Foelak
*Attorney, Agent, or Firm*—Robert E. Burns; Emmanuel J. Lobato; Bruce L. Adams

[57] ABSTRACT

A molded mass containing granules of expanded thermoplastic resin mixed with a mineral binder is manufactured by preparing a molding mass in a single operation by mixing expanded thermoplastic resin granules with water, water soluble resin and a mineral binder and then pouring the resultant mixture into a mold until the mixture solidifies into the desired molded mass.

8 Claims, No Drawings

METHOD OF MAKING A LIGHTWEIGHT PLASTER FROM GRANULES OF EXPANDED THERMOPLASTICS

This is a continuation, of application Ser. No. 908,799, filed May 23, 1978, now abandoned.

The present invention refers to a method of manufacture of a moulded mass containing granules of expanded thermoplastic resins mixed with a mineral binder.

BACKGROUND OF THE INVENTION

Light moulded masses, light concrete and light plasters containing granules of expanded thermoplastic resins, have numerous applications: manufacture of prefabricated parts such as: slabs, parpens, studs, rough masonry, various boxes, drain pipes and plates, bridge parts, underlay for roads, posts, insulation panels, partition walls, chimney stacks, etc.

Poured on site into shuttering and in pavings and cappings, they likewise find numerous applications in building construction and civil engineering.

The presence of expanded thermoplastic resin granules distributed in the mass confers upon this material besides a range of density running from 100 kg/m$^3$ up to the weight of normal concrete, and similarly for plaster, new qualities of heat and sound insulation, insulation against moisture and against the propagation of fire.

In the manufacture of these materials it is found that the expanded thermoplastic resin granules are water-repellant and have a very low density, for certain expanded thermoplastic resins less than 10 kg/m$^3$. Under these conditions the expanded thermoplastic resin granules just as they are, are difficult to mix in a homogeneous fashion in mortar or in plaster.

In order to take this fact into account a two-stage process has been proposed for mortar.

In a first operation the expanded thermoplastic resin granules are precoated with a mixture of epoxy and/or epikote and laromin resins emulsified in water, expanded thermoplastic resin granules, cement and volcanic ash are then dried.

In a second operation the granules thus coated are mixed with cement, sand, and water in order to prepare a light concrete.

This method is very costly, firstly because it needs two operations, secondly because of the very high cost of the resins employed. The result is that the use of this material is very much restricted.

SUMMARY OF THE INVENTION

The present invention involves a method wherein only one operation expanded thermoplastic resin granules are mixed with water, water-soluble resin and a mineral binder and this mixture is poured into a mould where it solidifies.

The water-soluble resins employed in proportions running from 0.005 kg to 5 kg/m$^3$ of finished product are preferably vinylic resins, acrylic resins, cellulosic resins, copolymers, and modified vinylic, acrylic and cellulosic resins. These resins are employed either alone of different molecular masses, or as a mixture of resins of the same group but of different molecular masses, or as mixtures of resins belonging to the aforesaid groups.

These resins and their mixtures are employed either just as they are and in solution, or as a mixture with organic and mineral adjuvants soluble in water and emulsifiable organic and mineral adjuvants enabling the properties of the final products to be improved.

The mineral binder will according to these circumstances be cement with sand and/or gravel or plaster without fillers or with granular and fibrous fillers.

A preferred formula of the method for the preparation of 1 m$^3$ of light concrete consists in:

Mixing with 950 l. of expanded polystyrene granules 100 gr of polyvinyl alcohol in solution in 10 l. of water, then introducing into it 300 kg of cement and 300 kg of sand, the whole is mixed while adding water until the desired consistency and one proceeds to moulding either in moulds, or on site in shuttering and on paving.

A preferred formula of the method for the preparation of 1 m$^3$ of light plaster consists in:

Mixing with 950 l. of expanded polystyrene granules 100 gr of polyvinyl alcohol in solution in 10 l. of water, then introducing into it 300 kg of plaster, the whole is kneaded rapidly while adding water until the desired consistency and one proceeds to moulding, to spraying or to pouring for the continuous production of slabs and sections.

With masses prepared in accordance with the method of the invention it is obviously possible to obtain products reinforced with metal reinforcement and with glass and thermoplastic fabrics. It is also possible during mixing to introduce granular and/or fibrous fillers in order to modify the qualities of the finished products.

It is also possible to cover the moulded and poured faces obtained with hard coatings or flexible coatings.

I claim:

1. A method of manufacture of a molded mass containing granules of expanded thermoplastic resin mixed with a mineral binder, comprising preparing a molding mass in a single operation by mixing said expanded thermoplastic resin granules directly with water, a homogenizing agent consisting essentially of polyvinyl alcohol and a mineral binder and then pouring said mixture into a mold where said mixture solidifies into said molded mass.

2. A method according to claim 1 wherein the mineral binder is cement with sand and gravel and that the finished product is light concrete.

3. A method according to claim 1 wherein the mineral binder is plaster and that the finished product is light plaster.

4. A method according to claim 1 wherein for the preparation of 1 m.$^3$ of light concrete 950 liters of expanded polystyrene granules are mixed with 100 g. of polyvinyl alcohol in solution in 10 liters of water, then 300 kg. of cement and 300 kg. of sand are introduced thereto and the resultant mixture is mixed while water is added thereto until the desired consistency is obtained.

5. A method according to claim 1 wherein for the preparation of 1 m.$^3$ of light plaster 950 l. of expanded polystyrene granules are mixed with 100 g. of polyvinyl alcohol, then 300 kg. of plaster are introduced thereto and the resultant mixture is kneaded rapidly while water is added thereto until the desired consistency is obtained.

6. A method according to claim 1 wherein polyvinyl alcohol in an amount of about 0.005 kg./m.$^3$ to 5 kg./m.$^3$ based on said molded mass is mixed with said expanded thermoplastic resin granules, water and said mineral binder.

7. A method according to claim 6 in which said mineral binder is selected from the group consisting of plaster, a mixture of plaster and a granular or fibrous filler, a mixture of cement and sand, cement and gravel, and cement sand and gravel.

8. A method according to claim 1 wherein said molding mass consists essentially of a mixture of expanded thermoplastic resin granules, polyvinyl alcohol, mineral binder and water.

* * * * *